United States Patent
Sullivan et al.

(10) Patent No.: US 10,343,024 B2
(45) Date of Patent: *Jul. 9, 2019

(54) POLYESTER-BASED THERMOPLASTIC ELASTOMERS CONTAINING PLASTICIZERS FOR MAKING GOLF BALLS

(71) Applicant: Acushnet Company, Fairhaven, MA (US)

(72) Inventors: Michael J. Sullivan, Old Lyme, CT (US); Mark L. Binette, Mattapoisett, MA (US); Robert Blink, Newport, RI (US); David A. Bulpett, Boston, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,447

(22) Filed: Mar. 23, 2018

(65) Prior Publication Data

US 2018/0207492 A1 Jul. 26, 2018

Related U.S. Application Data

(60) Division of application No. 15/236,569, filed on Aug. 15, 2016, now Pat. No. 9,925,423, which is a
(Continued)

(51) Int. Cl.
*A63B 37/06* (2006.01)
*A63B 37/00* (2006.01)
(Continued)

(52) U.S. Cl.
CPC ........ *A63B 37/0092* (2013.01); *A63B 37/005* (2013.01); *A63B 37/0039* (2013.01);
(Continued)

(58) Field of Classification Search
CPC .................................................. A63B 37/0039
(Continued)

(56) References Cited

U.S. PATENT DOCUMENTS 4,104,216 A 8/1978 Clampitt
5,183,843 A 2/1993 Sakai et al.
(Continued)

OTHER PUBLICATIONS

DOW "Amplity GR Functional Polymers" (Aug. 2010) The DOW Chemical Company.
(Continued)

*Primary Examiner* — Raeann Gorden
(74) *Attorney, Agent, or Firm* — Daniel W. Sullivan

(57) ABSTRACT

Multi-layered golf balls having at least one layer made of a polyester composition containing a polyester thermoplastic elastomer and plasticizer are provided. The plasticizers help reduce the glass transition temperature (Tg) of the composition and various plasticizers may be used. For example, the composition may include alkyl oleate plasticizers such as ethyl oleate and octyl oleate. Polyester-ether block copolymers are particularly preferred. The golf ball includes a core having at least one layer and a cover having at least one layer. The polyester composition may be used to form any core, cover, or other layer in the golf ball.

9 Claims, 2 Drawing Sheets

Related U.S. Application Data continuation of application No. 14/532,141, filed on Nov. 4, 2014, now Pat. No. 9,415,268.

(51) Int. Cl.
| | | |
|---|---|---|
| *C08K 5/101* | (2006.01) | |
| *C08L 67/02* | (2006.01) | |
| *C08L 23/08* | (2006.01) | |

(52) U.S. Cl.
CPC ...... *A63B 37/0043* (2013.01); *A63B 37/0044* (2013.01); *A63B 37/0049* (2013.01); *A63B 37/0051* (2013.01); *A63B 37/0062* (2013.01); *A63B 37/0063* (2013.01); *A63B 37/0075* (2013.01); *C08K 5/101* (2013.01); *C08L 23/0876* (2013.01); *C08L 67/025* (2013.01); *A63B 37/0076* (2013.01); *C08L 2207/04* (2013.01)

(58) Field of Classification Search
USPC .......................................................... 473/373
See application file for complete search history.

(56) References Cited

U.S. PATENT DOCUMENTS

| | | |
|---|---|---|
| 5,527,847 A | 6/1996 | Mumcu et al. |
| 5,683,817 A | 11/1997 | Kenmochi |
| 5,703,166 A | 12/1997 | Rajagopalan et al. |
| 5,824,746 A | 10/1998 | Harris et al. |
| 5,973,046 A | 10/1999 | Chen et al. |
| 5,981,658 A | 11/1999 | Rajagopalan et al. |
| 6,150,462 A | 11/2000 | Rajagopalan et al. |
| 6,274,669 B1 | 8/2001 | Rajagopalan |
| 6,306,049 B1 | 10/2001 | Rajagopalan |
| 6,329,458 B1 | 12/2001 | Takesue et al. |
| 6,376,037 B1 | 4/2002 | Montanari et al. |
| 6,476,130 B1 | 11/2002 | Rajagopalan et al. |
| 6,538,099 B2 | 3/2003 | Isobe et al. |
| 6,528,560 B2 | 4/2003 | Buhler |
| 6,562,906 B2 | 5/2003 | Chen |
| 6,565,455 B2 | 5/2003 | Hayashi et al. |
| 6,653,382 B1 | 11/2003 | Statz et al. |
| 6,756,436 B2 | 6/2004 | Rajagopalan et al. |
| 6,774,184 B2 | 8/2004 | Rajagopalan et al. |
| 6,800,690 B2 | 10/2004 | Rajagopalan et al. |
| 6,831,137 B2 | 12/2004 | Torre et al. |
| 6,833,400 B2 | 12/2004 | Ichikawa et al. |
| 6,872,774 B2 | 3/2005 | Sullivan et al. |
| 6,943,231 B2 | 9/2005 | Buhler |
| 7,045,185 B2 | 5/2006 | Jacques et al. |
| 7,144,938 B1 | 12/2006 | Feinberg et al. |
| 7,297,737 B2 | 11/2007 | Fish, Jr. et al. |
| 7,312,267 B2 | 12/2007 | Kennedy, III et al. |
| 7,348,046 B2 | 3/2008 | Liedoff et al. |
| 7,365,128 B2 | 4/2008 | Sullivan |
| 7,528,196 B2 | 5/2009 | Kim et al. |
| 8,044,136 B2 | 10/2011 | De Garavilla |
| 8,202,925 B2 | 6/2012 | De Garavilla |
| 8,309,643 B2 | 11/2012 | Thullen et al. |
| 8,399,557 B2 | 3/2013 | Montanari et al. |
| 8,507,598 B2 | 8/2013 | Buhler et al. |
| 9,415,268 B2 * | 8/2016 | Sullivan ............ A63B 37/0039 |
| 9,925,423 B2 * | 3/2018 | Sullivan ............ A63B 37/0039 |
| 2001/0046906 A1 | 11/2001 | Rajagopalan et al. |
| 2002/0037778 A1 | 3/2002 | Nakamura et al. |
| 2002/0039933 A1 | 4/2002 | Nakamura et al. |
| 2005/0209026 A1 | 9/2005 | Higuchi et al. |
| 2006/0172823 A1 | 8/2006 | Loper et al. |
| 2007/0100085 A1 | 5/2007 | Kim et al. |
| 2010/0160079 A1 | 6/2010 | Kim et al. |
| 2010/0160082 A1 | 6/2010 | Rajagopalan et al. |
| 2010/0167845 A1 | 7/2010 | Kim et al. |
| 2010/0183837 A1 | 7/2010 | Hochstetter et al. |
| 2010/0203275 A1 | 8/2010 | Hoffmann et al. |
| 2011/0152450 A1 | 6/2011 | Kobayashi et al. |
| 2012/0223453 A1 | 9/2012 | Grimes et al. |
| 2013/0202831 A1 | 8/2013 | Chhun et al. |
| 2013/0247983 A1 | 9/2013 | Jousset et al. |

OTHER PUBLICATIONS http://www.tech-white-papers.com/ (Feb. 17, 2010) DuPont Polymer Modifiers, "Polyamide Toughening Using DuPont Polymer Modifiers". DuPont, Product and Properties Guide Hytrel; Nov. 1999.

* cited by examiner

POLYESTER-BASED THERMOPLASTIC ELASTOMERS CONTAINING PLASTICIZERS FOR MAKING GOLF BALLS

CROSS-REFERENCE TO RELATED APPLICATIONS

This application is a divisional of co-pending, co-assigned, U.S. patent application Ser. No. 15/236,569 having a filing date of Aug. 15, 2016, now allowed, which is a continuation of co-assigned, U.S. patent application Ser. No. 14/532,141 having a filing date of Nov. 4, 2014, now issued as U.S. Pat. No. 9,415,268 with an issue date of Aug. 16, 2016, the entire disclosures of which are hereby incorporated by reference.

BACKGROUND OF THE INVENTION

Field of the Invention

The present invention generally relates to multi-layered golf balls and more particularly to golf balls having at least one layer made of polyester/plasticizer compositions. The golf ball includes a core having at least one layer and a cover having at least one layer. The polyester/plasticizer composition may be used to form any core, cover, or other layer in the golf ball. In one version, the composition comprises a blend of polyester, plasticizer, and polyamide. Preferably, a polyester-ether copolymer is used in the composition.

Brief Review of the Related Art

Multi-layered, solid golf balls are used today by recreational and professional golfers. Basically, these golf balls contain an inner core protected by a cover. The core acts as the primary engine for the ball and the cover helps provide the ball with durability and wear-resistance. The core and cover may be single or multi-layered. For example, three-piece golf balls having an inner core, inner cover layer, and outer cover layer are popular. In other instances, golfers will use a four-piece ball containing a dual-core (inner core and surrounding outer-core layer) and dual-cover (inner cover layer and surrounding outer cover layer). Intermediate layer(s) may be disposed between the core and cover layers to impart various properties. Thus, five-piece and even six-piece balls can be made. Normally, the core layers are made of a natural or synthetic rubber material or highly neutralized ionomer polymers (HNPs). These ionomer polymers are typically copolymers of ethylene and methacrylic acid or acrylic acid that are partially or fully neutralized. Metal ions such as sodium, lithium, zinc, and magnesium are used to neutralize the acid groups in the copolymer.

Such ethylene acid copolymer ionomer resins are relatively hard materials having good durability, cut-resistance, and toughness. The ionomers may be used to make cover, intermediate, and core layers. When used as a core material, the hard ionomer resin helps impart a higher initial velocity to the golf ball. This is particularly advantageous for driver shots off the tee. The ball tends to have good flight distance. However, one disadvantageous feature of such balls is they tend to have a hard "feel." Some players experience a harsher, less comfortable feel when their club face makes contact with these hard balls. The player senses less control and the harder ball tends to have low initial spin. It is generally more difficult to hit hard balls with the proper touch and control. This can be particularly troublesome when making approach shots with irons near the green.

Thus, the industry has looked at numerous non-ionomeric materials such as polyolefins, polyamides, polyesters, polyurethanes, polyureas, fluoropolymers, polyvinyl chlorides, polycarbonates, polyethers, polyimides, and the like for making various components and layers in golf balls. For example, Nakamura et al, US Patent Application Publication 2002/0037778 discloses golf balls having a multi-layered core construction including a center core and outer core layer; and a cover. The center core is made of a thermoplastic resin or elastomer, and examples of these materials include ionomer resins, thermoplastic polyamide elastomers, and thermoplastic polyester elastomers. The outer core is preferably made of a rubber composition. The center core has a Shore D hardness of 15 to 50, and the outer core layer has a Shore D hardness near the interface of the center core which is 1 to 15 units higher than the Shore D hardness of the center core.

Nakamura et al, US Patent Application Publication 2002/0039933 also discloses golf balls having a multi-layered core construction including a center core and outer core layer. The center core is made of thermoplastic resins or thermoplastic elastomers, such as nylons, polyarylates, ionomer resins, polypropylene resins, thermoplastic polyurethane elastomers and thermoplastic polyester elastomers In the '778 Publication, the outer core layer has a two-layer construction in which the resin or resin/rubber mixture is used to form the inside layer and a rubber composition is used to form the outside layer; and a cover.

In Loper et al., US Patent Application Publication 2006/0172823, four-piece golf balls having one or more core layers, an inner mantle layer, an outer mantle layer, and one or more cover layers are disclosed. In one embodiment, the composition of inner mantle layer and/or the outer mantle layer comprises a blend of polyamide or copolymeric polyamide and another polymer. According to the '823 Publication, suitable other polymers for the blend include ionomers, co-polyetheramide elastomers, polyarylates, polyolefins, polyoctenamers, polyurethanes, styrenic block copolymers, metallocene catalized polymers, and polyesters.

Although some non-ionomeric compositions containing polyesters as mentioned above may be somewhat effective for making certain components and layers in a golf ball, there is still a need for new compositions that can impart high quality performance properties to the ball. Particularly, there is a continuing need for improved core constructions in golf balls. The core material should have good toughness and provide the ball with high resiliency. The core material, however, should not be excessively hard and stiff so that properties such as feel, softness, and spin control are sacrificed. The present invention provides golf balls having an optimum combination of properties.

SUMMARY OF THE INVENTION

The present invention generally relates to multi-layered golf balls and more particularly to golf balls having at least one layer made of polyester/plasticizer compositions. In one version, the ball comprises a dual core having an inner core and surrounding outer core layer; and a cover having at least one layer disposed about the core structure. The inner core has an outer surface and geometric center, while the outer core layer has an outer surface and inner surface. In one preferred embodiment, the inner core comprises a rubber composition and the outer core layer comprises a polyester composition. In particular, the polyester composition comprises: i) about 40 to about 99% by weight polyester thermoplastic elastomer; and ii) about 1 to about 60% by weight plasticizer. In one version, the geometric center of the inner core and surface of the outer core layer each has hardness, and the surface hardness of the outer core layer is greater than the center hardness of the inner core.

Suitable polyesters include, for example, polyester-polyether block copolymers. In one preferred version, the polyester-polyether has a flex modulus of less than 50,000 psi. In another version, the polyester-polyether has a flex modulus of 50,000 psi or greater.

In some instances, the polyester-based thermoplastic elastomer composition may further comprise a polyamide, preferably a transparent polyamide such as a transparent polyether-amide block copolymer. In other instances, the polyester-based thermoplastic elastomer composition further comprises other thermoplastics such as an acid copolymer of ethylene and an $\alpha,\beta$-unsaturated carboxylic acid, optionally including a softening monomer selected from the group consisting of alkyl acrylates and methacrylates; and a cation source present in an amount sufficient to neutralize from about 0 to about 100% of all acid groups present in the composition. Preferably, the ethylene acid copolymer contains acid groups such that greater than 70% of the acid groups are neutralized, and more preferably 90% or greater of the acid groups are neutralized.

Various plasticizers may be used in the polyester-based thermoplastic composition. In one particularly preferred version, the thermoplastic composition comprises a fatty acid ester, particularly an alkyl oleate, and more particularly a compound selected from the group consisting of methyl oleate, ethyl oleate, propyl oleate, butyl oleate, and octyl oleate, and mixtures thereof. Ethyl oleate plasticizers are particularly preferred. The thermoplastic composition preferably comprises about 3 to about 50% by weight plasticizer, more preferably about 8 to about 42%, and even more preferably about 10 to about 30%, plasticizer based on weight of composition. In one version, the center hardness of the inner core is in the range of 15 to about 85 Shore C, and the surface hardness of the outer core layer is in the range of about 20 to about 90 Shore C, whereby the surface hardness of the outer core layer is greater than the center hardness of the inner core.

The polyester compositions of this invention may be used in one or more core, intermediate or cover layers. For instance, the compositions may be used in an innermost core or center layer, an intermediate core layer, or in an outermost core layer. The composition also may be used, for example, in an inner, intermediate or outermost cover layer. The compositions have a good combination of properties including Coefficient of Restitution (COR) and compression so they can be used to make various golf ball layers. In one version, a molded sphere comprising a polyester composition of about 90% polyester and about 10% plasticizer has a COR of at least about 0.650; a DCM Compression of no greater than 70, and Shore D surface hardness of no greater than 50. For example, the sphere may have a COR of at least about 0.700; a DCM Compression in the range of 5 to 65, and Shore D surface hardness in the range of 20 to 50.

In one example, the cover of the golf ball is a single layer having a thickness of about 0.015 to about 0.090 inches. In another example, the cover comprises two or more layers and has an overall thickness of about 0.020 to about 0.160 inches. Thermoplastic or thermoset materials such as

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
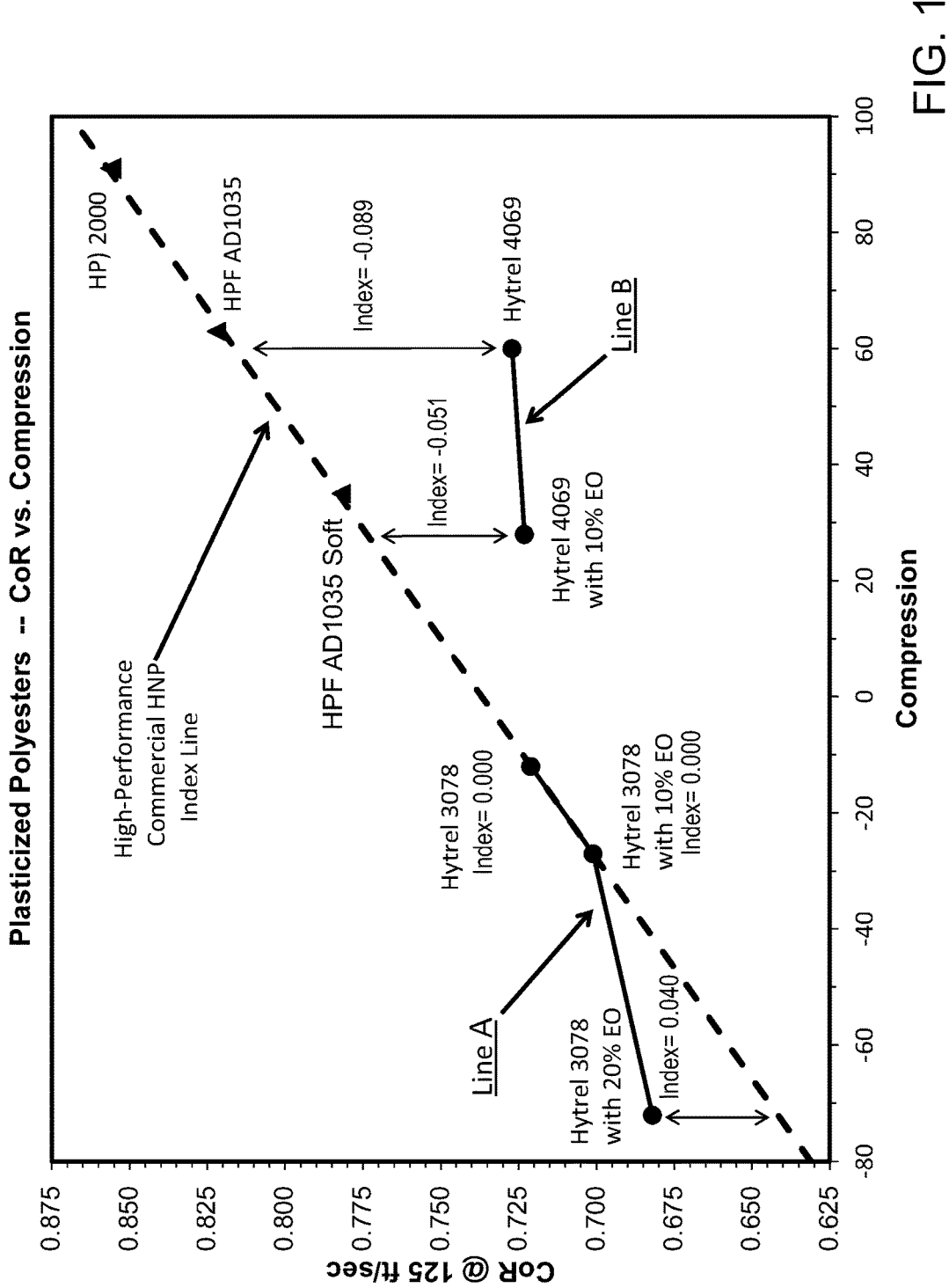
FIG. 1 is a graph showing the Coefficient of Restitution (COR) of commercially-available highly neutralized ethylene acid copolymer (HNP) samples and polyester-ether block copolymer/plasticizer samples of this invention plotted against the DCM Compression (DCM) of the respective samples and includes an Index Line.

The present invention relates generally to golf balls containing at least one component made from a polyester-based composition. Particularly, the polyester composition comprises: i) about 40 to about 99 weight percent of polyester; and ii) about 1 to about 60 weight percent of plasticizer.

Golf balls having various constructions may be made in accordance with this invention. For example, golf balls having two-piece, three-piece, four-piece, and five-piece constructions with single or multi-layered core, intermediate, and cover portions may be made. The term, "layer" as used herein means generally any spherical portion of the golf ball. More particularly, in one version, a two-piece golf ball having a core and surrounding cover is made. In another version, a three-piece ball containing a dual-core and cover may be made. The dual-core includes an inner core (center) and surrounding outer core layer. Four-piece golf balls comprising a dual-core and dual-cover an inner cover and outer cover also may be made. In yet another construction, a four-piece or five-piece golf ball having a multi-layered core comprising an inner core (center), intermediate core layer, and outer core layer, may be made. The golf balls of this invention may further contain an intermediate layer(s). As used herein, the term, "intermediate layer" means a layer of the ball disposed between the core and cover. The diameter and thickness of the different layers along with properties such as hardness and compression may vary depending upon the construction and desired playing performance properties of the golf ball.

The polyester-containing compositions disclosed herein may be used in one or more core, intermediate or cover layers. For instance, the compositions may be used in an innermost core or center layer, and intermediate core layer or in an outermost core layer. Further the layer may be an inner, intermediate or outermost cover layer. For example in a golf ball having a three-layered cover, the polyester-containing composition may be used in any of the three layers, but preferably is used in the inner or intermediate cover layer, or both. The polyester-comprising compositions are thermoplastic compositions and may be adjacent to another thermoplastic composition or may be adjacent to a thermosetting composition. For example, in a three (3) or more layered-core construction, the center may be a thermosetting rubber composition, an intermediate core layer may comprise a polyester-based composition, and the outer core layer may be made from a thermosetting rubber composition. Alternatively, the center and intermediate core layer may comprise a thermosetting rubber and the outer core layer comprises the thermoplastic polyester-based composition, and the like. In a two-piece construction comprising a core and a cover, either the core or cover or both layers may consist of the polyester-containing composition.

Polyesters

As discussed above, polyester-based thermoplastic elastomers may be used to form the compositions of this invention. In general, "thermoplastic elastomers" refer to a class of polymers having thermoplastic-like (softens when exposed to heat and returns to original condition when cooled) properties and elastomeric-like (can be stretched and then returns to original condition when released) properties. In thermoplastic elastomer block copolymers, there are some blocks having thermoplastic-like properties and these blocks may be referred to as "hard" segments. Also, there are some blocks having elastomeric-like properties and these blocks may be referred to as "soft" segments. The ratio of hard to soft segments and the composition of the segments are significant factors in determining the properties of the resulting thermoplastic elastomer.

One example of a suitable polyester thermoplastic elastomer that can be used to form the compositions of this invention is polyester-polyether block copolymers. In general, these block copolymers contain hard and soft segments having various lengths and sequences. The hard, crystalline polyester segments are normally derived from reacting an aromatic-containing dicarboxylic acid or diester such as, for example, terephthalic acid, dimethyl terephthalate, and the like with a diol containing about 2 to about 10 carbon atoms. For example, the hard segments may constitute butylene terephthalate, tetramethylene terephthalate, or ethylene terephthalate units. The soft, elastomeric segments are normally derived from long or short-chain poly(alkylene oxide) glycols containing a total of about 3 to about 12 carbon atoms including up to 3 or 4 oxygen atoms with the remaining atoms being hydrocarbon atoms. Useful poly(alkylene oxide) glycols include, for example, poly(oxyethylene) diol, poly(oxypropylene) diol, and poly(oxytetramethylene) diols. More particularly, the polyether polyols have been based on polymers derived from cyclic ethers such as ethylene oxide, 1,2-propylene oxide and tetrahydrofuran. When these cyclic ethers are subjected to ring opening polymerization, they provide the corresponding polyether glycol, for example, polyethylene ether glycol (PEG), poly(1,2-propylene) glycol (PPG), and polytetramethylene ether glycol (PO4G, also referred to as PTMEG).

One preferred polyester thermoplastic elastomer is Riteflex® material, available from Ticona-Celanese Corp. The Riteflex® TPC-ET products include different grades of polyester-polyether block copolymers, and examples of such materials and their respective properties are described in below Table 1. Another preferred polyester-polyether block copolymer is commercially-available under the trademark, Hytrel®, from DuPont. The Hytrel® polyester block copolymers are available in different grades and contain hard (crystalline) segments of polybutylene terephthalate and soft (amorphous) segments based on long-chain polyether glycols. These and other examples of polyester-polyether block copolymers which can be used in accordance with the present invention are disclosed in U.S. Pat. Nos. 2,623,031; 3,651,014; 3,763,109; and 3,896,078, the disclosures of which are hereby incorporated by reference. Different grades of Hytrel® polyester-polyether block copolymers and their respective properties, which may be used in accordance with this invention, are described in the following Tables 2 and 3.

TABLE 1

Properties of Riteflex ® Polyester Block Copolymers

| Property | Test Method | Units | RITEFLEX ® Grade | | | | |
| --- | --- | --- | --- | --- | --- | --- | --- |
| | | | 425 | 440 | 640A | 663 | 677 |
| Hardness, durometer D | ISO 868 | D | 24 | 38 | 40 | 63 | 75 |
| Flexural Modulus | ISO 178 | | | | | | |
| at −40° C. | | MPa | 162 | 270 | 115 | 1900 | 2500 |
| at 23° C. | | | 17 | 45 | 70 | 325 | 650 |
| at 100° C. | | | 8 | 28 | 32 | 150 | 240 |
| Tensile stress at break | ISO 527 | MPa | 10 | 18 | 17 | 38 | 42 |
| Elongation at break | ISO 527 | % | >500 | >500 | >500 | >450 | >300 |
| Izod impact | ISO180 | | | | | | |
| at −40° C. | | kj/m² | no break | no break | no break | 7c | 4.7c |
| at +23° F. | | | no break | no break | no break | 74p | 8.5 |
| Melt flow rate Temp ° C. at 2.16 kg load | ISO1133 | g/10 min | 13 (190° C.) | 13 (220° C.) | 10 (220° C.) | 19 (240° C.) | 15 (240° C.) |
| Melting point | ISO11357 | ° C. | 155 | 195 | 170 | 212 | 218 |
| Vicat softening point | ISO 306 | ° C. | 61 | 127 | 119 | 194 | 213 |
| Specific Gravity | ISO 1183 | g/cm³ | 1.06 | 1.11 | 1.13 | 1.24 | 1.27 |

TABLE 2

Properties of Hytrel ® Polyester-polyether Block Copolymers

| Property | Test Method | Units | HYTREL ® Grade | | | | |
|---|---|---|---|---|---|---|---|
| | | | F3548L | G4074 | G4778 | G5544 | 4056 |
| Hardness, durometer D | D 2240 | D | 35 | 40 | 47 | 55 | 40 |
| Flexural Modulus | D790 | | | | | | |
| at −40° C. | method I | Ksi | 9 | 30 | 47 | 123 | 22.5 |
| at 73° F. | Proc B | | 4.7 | 9.5 | 17 | 28 | 9 |
| at 212° F. | | | 1 | 4.75 | 10 | 18 | 3.9 |
| Tensile stress at break | D 638 | ksi | 1.49 | 2 | 3 | 4.5 | 4.05 |
| Elongation at break | D638 | % | 200 | 230 | 300 | 375 | 550 |
| Izod impact | D256 | | | | | | |
| at −40° C. | method A | ft lb/in | no break | 0.5 | 3.1 | 2.5 | no break |
| At 73° F. | | | no break | no break | no break | no break | no break |
| Melt flow rate | D1238 | g/10 min | 10 | 5.2 | 13 | 10 | 5.3 |
| Temp ° F. at 2.16 kg load | | | 374 | 374 | 446 | 446 | 374 |
| Melting point | D3418 | ° F. | 312 | 338 | 406 | 419 | 302 |
| Vicat softening point | D1526 | ° F. | 171 | 233 | 347 | 385 | 226 |
| Specific Gravity | Rate B D792 | | 1.15 | 1.18 | 1.2 | 1.22 | 1.17 |

TABLE 3

Properties of Hytrel ® Polyester-polyether Block Copolymers

| Property | Test Method | Units | HYTREL ® Grade | | | | |
|---|---|---|---|---|---|---|---|
| | | | 4556 | 6356 | 7246 | 8238 | 3078 |
| Hardness durometer | D 2240 | D | 45 | 63 | 72 | 82 | 30 |
| Flexural Modulus | D790 | | | | | | |
| at −40° C. | method I | Ksi | 33 | 260 | 350 | 440 | 21 |
| At 73° F. | Proc B | | 14 | 48 | 83 | 175 | 4 |
| At 212° F. | | | | 6.4 | 22 | 30 | 37 | 2 |
| Tensile stress at break | D 638 | Ksi | 4.5 | 6 | 6.6 | 7 | 5.8 |
| Elongation at break | D638 | % | 600 | 420 | 360 | 350 | 450 |
| Izod impact | D256 | | | | | | |
| at −40° C. | method A | ft lb/in | no break | 0.9 | 0.8 | 0.5 | No break |
| At 73° F. | | | no break | no break | 3.9 | 0.8 | No break |
| Melt flow rate | D1238 | g/10 min | 8.5 | 8.5 | 12.5 | 12.5 | 5 |
| Temp ° F. at 2.16 kg load | | | 428 | 446 | 464 | 464 | 374 |
| Melting point | D3418 | ° F. | 379 | 412 | 424 | 433 | 338 |
| Vicat softening point | D1526 | ° F. | 171 | 383 | 405 | 414 | 181 |
| Specific Gravity | Rate B D792 | | 1.14 | 1.22 | 1.25 | 1.28 | 1.07 |

As shown in above Tables 2 and 3, the flex modulus of some Hytrel® polyester-polyether block copolymers may fall within the range of about 1,000 to about 150,000 psi (or greater). Such block copolymers may be used to form a low modulus (or high modulus) core layer in accordance with this invention.

Polyester Blends

Blends of polyesters and blends of polyesters with other polymers may be used in accordance with this invention. For example, the polyester thermoplastic elastomer may be blended with other thermoplastics such as polyamides. Various plasticizers may be used in the polyester-based thermoplastic composition, and these plasticizers are discussed further below. Suitable polyamide elastomers that can be used to form the compositions of this invention include, for example. polyether-amide block copolymers, available from Arkema, Inc. (Columbs, France) as Pebax® resins. Other suitable polyamides include nylon 4, nylon 6, nylon 7, nylon 11, nylon 12, nylon 13, nylon 4,6; nylon 6,6; nylon 6,9; nylon 6,10; nylon 6,12; nylon 12,12; nylon 13,13; and mixtures thereof. More preferred polyamides include nylon 6, nylon 11, nylon 12, nylon 4,6; nylon 6,6; nylon 6,9; nylon 6,10; nylon 6,12; nylon 6/66; and nylon 6/69 and mixtures thereof.

Polyamides having mechanical properties that do not significantly change after the composition has been exposed to moisture are particularly effective. These polyamides can be used in compositions used for the outer core layer. The outer core layer encapsulates the inner core so that fluids do not penetrate therein and protects the inner core from moisture. Because the polyester-polyamide blends are relatively stable, they are particularly effective for making the core or cover layers in accordance with this invention. Transparent polyamides are particularly suitable for use in the blend compositions of this invention. Such transparent polyamides include transparent polyamide copolymers (co-polyamides). Suitable transparent polyamides that may be used in accordance with the present invention are further described in Sullivan et al., US Patent Application Publication 2014/0302947, the disclosure of which is hereby incorporated by reference.

Suitable commercially available transparent polyamides that may be used per this invention include, for example, copolyamides such as Platamid® 8020; semi-aromatic transparent polyamides such as Rilsan® Clear G170; transparent polyamides such as Rilsan® G120 Rnew; Rilsan® G830 Rnew and G830 L Rnew; Rilsan® G850; Rilsan® Clear G350 and G350L; Rilsan® G300 HI; and transparent polyamides that are partly based on bio-based raw materials such as Rilsan® Clear G830, all of which are available from Arkema, Inc. (King of Prussia, Pa.). Other suitable materials include Ultramid® polyamides, available from BASF; and Zytel™ and Dartek™ nylon resins, available from DuPont. EMS-Chemie AG (Domat/EMS, Switzerland) supplies different grades of transparent polyamides under the Grilamid mark, including; Grilamid® TR 30, TR55, TR90, XE 3997, XE 4028 grades, and these polyamides may be used per this invention. Grivory® G and GTR transparent polyamides also are available from EMS-Chemie AG and may be used in the compositions of this invention. Other suitable polyamides include Trogamid® and Vestamid® grades available from Evonik Industries, AG (Essen, Germany); Kopa® grades available from Kolon Plastics, Inc. (Gyeongsan-glouk-do, Korea) Durethan® grades available from Lanxess AG (Cologne, Germany); Arlen® grades available from Mitsui Chemicals (Tokyo, Japan); and transparent amorphous nylons such as Ashlene® 726SB, 746, 747, 747, 851, D870 and D870L available from Ashley Polymers (Brooklyn, N.Y.). Still other suitable polyamides include Radici Radilon® CST copolyamides (Chgnolo d'Isola, Italy); Shakespeare Isocor® CN30XT and CN30BT nylon 610 resins (Shakespeare Engineered Nylons owned by Jarden Applied Materials of Columbia, S.C.), Toyobo Glamide® T-714E nylons (Osaka, Japan); TP Composites Elastoblend® PA12 CL nylons (Aston, Pa.); and Aegis® polyamide compositions, available from Honeywell Plastics (Morris Township, N.J.). Transparent polyamides including, but not limited to, polyether-amide, polyester-amide, polyether-ester-amide block copolymers, are particularly suitable for use in the invention herein, and more particularly, the transparent polyamide copolymers, Rilsan Clear G300 HI, Pebax Clear 300, and Pebax Clear 400 available from Arkema, Inc. (King of Prussia, Pa.) are particularly effective.

In another example, the polyester thermoplastic elastomer may be blended with highly-neutralized polymers (HNP) and plasticizers. Various plasticizers may be used in the polyester/HNP-based thermoplastic composition, and these plasticizers are discussed further below. For purposes of the present disclosure, "HNP" refers to an acid polymer after at least 70%, preferably at least 80%, more preferably at least 90%, more preferably at least 95%, and even more preferably 100%, of the acid groups present are neutralized. It is understood that the HNP may be a blend of two or more HNPs. Suitable HNPs that may be used in accordance with the present invention are further described in Sullivan et al., US Patent Application Publication 2014/0113748, the disclosure of which is hereby incorporated by reference.

Preferred acid polymers are copolymers of an $\alpha$-olefin and a $C_3$-$C_8$ $\alpha,\beta$-ethylenically unsaturated carboxylic acid, optionally including a softening monomer. The $\alpha$-olefin is preferably selected from ethylene and propylene. The acid is preferably selected from (meth) acrylic acid, ethacrylic acid, maleic acid, crotonic acid, fumaric acid, and itaconic acid. (Meth) acrylic acid is particularly preferred. The optional softening monomer is preferably selected from alkyl (meth) acrylate, wherein the alkyl groups have from 1 to 8 carbon atoms. Preferred acid copolymers include, but are not limited to, those wherein the $\alpha$-olefin is ethylene, the acid is (meth) acrylic acid, and the optional softening monomer is selected from (meth) acrylate, n-butyl (meth) acrylate, isobutyl (meth) acrylate, methyl (meth) acrylate, and ethyl (meth) acrylate. Particularly preferred acid copolymers include, but are not limited to, ethylene/(meth) acrylic acid/n-butyl acrylate, ethylene/(meth) acrylic acid/methyl acrylate, and ethylene/(meth) acrylic acid/ethyl acrylate.

Suitable acid copolymers for forming the HNP also include acid polymers that are already partially neutralized. Examples of suitable partially neutralized acid copolymers include, but are not limited to, Surlyn® ionomers, commercially available from E. I. du Pont de Nemours and Company; AClyn® ionomers, commercially available from Honeywell International Inc.; and Lotek® ionomers, commercially available from ExxonMobil Chemical Company. Also suitable are DuPont® HPF 1000 and DuPont® HPF 2000, ionomeric materials commercially available from E. I. du Pont de Nemours and Company. In some embodiments, very low modulus ionomer-("VLMI-") type ethylene-acid copolymers are particularly suitable for forming the HNP, such as Surlyn® 6320, Surlyn® 8120, Surlyn® 8320, and Surlyn® 9320, commercially available from E. I. du Pont de Nemours and Company.

The $\alpha$-olefin is typically present in the acid copolymer in an amount of 15 wt % or greater, or 25 wt % or greater, or 40 wt % or greater, or 60 wt % or greater, based on the total weight of the acid copolymer. The acid is typically present in the acid copolymer in an amount within a range having a lower limit of 1 or 2 or 4 or 6 or 8 or 10 or 12 or 15 or 16 or 20 wt % and an upper limit of 20 or 25 or 26 or 30 or 35 or 40 wt %, based on the total weight of the acid copolymer. The optional softening monomer is typically present in the acid copolymer in an amount within a range having a lower limit of 0 or 1 or 3 or 5 or 11 or 15 or 20 wt % and an upper limit of 23 or 25 or 30 or 35 or 50 wt %, based on the total weight of the acid copolymer.

The HNP is formed by reacting the acid copolymer with a sufficient amount of cation source, optionally in the presence of a high molecular weight organic acid or salt thereof, such that at least 70%, preferably at least 80%, more preferably at least 90%, more preferably at least 95%, and even more preferably 100%, of all acid groups present are neutralized. Suitable plasticizers are described further below. In a particular embodiment, the cation source is present in an amount sufficient to neutralize, theoretically, greater than 100%, or 105% or greater, or 110% or greater, or 115% or greater, or 120% or greater, or 125% or greater, or 200% or greater, or 250% or greater of all acid groups present in the composition.

Suitable cation sources include metal ions and compounds of alkali metals, alkaline earth metals, and transition metals; metal ions and compounds of rare earth elements; and combinations thereof. Preferred cation sources are metal ions and compounds of magnesium, sodium, potassium, cesium, calcium, barium, manganese, copper, zinc, tin, lithium, and rare earth metals. The acid copolymer may be at least partially neutralized prior to contacting the acid copolymer with the cation source to form the HNP. Methods of preparing ionomers, and the acid copolymers on which ionomers are based, are disclosed, for example, in U.S. Pat. Nos. 3,264,272, and 4,351,931, and U.S. Patent Application Publication No. 2002/0013413.

Plasticizers

As discussed above, the polyester compositions of this invention contain a plasticizer. Adding the plasticizers helps to reduce the glass transition temperature (Tg) of the composition. The glass transition in a polymer is a temperature range below which a polymer is relatively brittle and above which it is rubber-like. In addition to lowering the Tg, the plasticizer may also reduce the tan δ in the temperature range above the Tg. The Tg of a polymer is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. The effects of adding a plasticizer to the polyester composition on Tg, flex modulus, hardness, and other physical properties are discussed further below.

The polyester-based compositions may contain one or more plasticizers. The plasticizers that may be used in the polyester compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BD-BSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate; and blends thereof.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate, and blends thereof are suitable. Iso- and terephthalates such as Dioctyl terephthalate and Dinonyl isophthalate may be used. Also appropriate are trimellitates such as Trimethyl trimellitate (TMTM),Tri-(2-ethylhexyl) trimellitate (TOTM),Tri-(n-octyl,n-decyl) trimellitate, Tri-(heptyl,nonyl) trimellitate, Tri-n-octyl trimellitate; as well as benzoates, including: 2-ethylhexyl-4-hydroxy benzoate, n-octyl benzoate, methyl benzoate, and ethyl benzoate, and blends thereof Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS), and blends thereof. Also, esters based on glycols, polyglycols and polyhydric alcohols such as poly (ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate, and blends thereof may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate. Mixtures of any of the plasticizers described herein also may be used in accordance with this invention. In a particularly preferred version, the fatty acid ester is an alkyl oleate selected from the group consisting of methyl, propyl, ethyl, butyl, octyl, and decyl oleates. For example, in one version, ethyl oleate is used as the plasticizer. In another version, butyl oleate or octyl oleate is used in the composition. Suitable commercially-available fatty acids include, for example, SylFat™ FA2 Tall Fatty Acid, available from Arizona Chemical. The fatty acid composition includes 2% saturated, 50% oleic, 37% linoleic (non-conjugated), and 7% linoleic (conjugated) fatty acids; and 4% other fatty acids. This fatty acid typically has an acid value in the range of 195 to 205 mg KOH/gm.

Glycerol-based esters such as soy-bean, tung, or linseed oils or their epoxidized derivatives or blends thereof can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate (TBP), octyldiphenyl phosphate, alkyl sulfonic acid phenyl esters (ASE); and blends thereof; and sulfonamides such as N-ethyl toluene sulfonamide,N-(2-hydroxypropyl) benzene sulfonamide, N-(n-butyl) benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alcohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the polyester-based compositions of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides also may be used in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl) benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference.

As noted above, the fatty acid esters are particularly preferred plasticizers in the present invention. It has been found that the fatty acid esters perform well as plasticizers in the polyester-based composition. The fatty acid esters have several advantageous properties. For example, the fatty acid esters are compatible with the polyester copolymers and they tend to blend uniformly and completely with the acid copolymer. Also, the fatty acid esters tend to improve the resiliency and/or compression of the composition as discussed further below. The polyester copolymer/plasticizer compositions may contain other ingredients that do not materially affect the basic and novel characteristics of the composition. For example, mineral fillers may be added as discussed above. In one particular version, the composition consists essentially of polyester copolymer as described above and plasticizer, particularly a fatty acid ester.

One method of preparing the fatty acid ester involves reacting the fatty acid or mixture of fatty acids with a corresponding alcohol. The alcohol can be any alcohol including, but not limited to, linear, branched, and cyclic alcohols. The fatty acid ester is commonly a methyl, ethyl, propyl, butyl, octyl, or other alkyl ester of a carboxylic acid that contains from 4 to 30 carbon atoms. In the present invention, ethyl, butyl, octyl, and decyl esters and particularly ethyl oleate, butyl oleate, and octyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated carboxylic acids, that is, a carboxylic acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

It is believed that the plasticizer should be added in a sufficient amount to the polyester composition so there is a substantial change in the stiffness and/or hardness of the polyester polymer. Thus, although the concentration of plasticizer may be as little as 1% by weight to form some polyester-based compositions per this invention, it is preferred that the concentration be relatively greater. For example, it is preferred that the concentration of the plasticizer be at least 3 weight percent (wt. %). More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%. Plasticized thermoplastic compositions of the present invention are not limited by any particular method or any particular equipment for making the compositions.

It is believed that adding the plasticizer to the polyester helps make the composition softer and more rubbery. Adding the plasticizers to the composition helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures. Thus, in one embodiment, the first polyester (containing polyester only) composition has a first flex modulus value and the second polyester (containing polyester and plasticizer) composition has a second flex modulus value, wherein the second flex modulus value is at least 1% less; or at least 2% less; or at least 4% less; or at least 8% less; or at least 10% less than the first modulus value.

More particularly, in one embodiment, the polyester/plasticizer composition has a flex modulus lower limit of about 500 (or less), 1,000, 1,600, 2,000, 4,200, 7,500, 9,000, 10,000 or 20,000 or 40,000 or 50,000 or 60,000 or 70,000 or 80,000 or 90,000 or 100,000; and a flex modulus upper limit of about 110,000 or 120,000 or 130,000 psi or 140,000 or 160,000 or 180,000 or 200,000 or 300,000 or greater. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the plasticizer to the polyester helps reduce the flex modulus of the composition and it also helps reduce hardness to a certain degree. Thus, in one embodiment, the polyester/plasticizer composition is relatively soft and having a hardness of no greater than 40 Shore D. For example, the Shore D hardness may be within a range having a lower limit of 15 or 18 or 20 or 22 or 24 and an upper limit of 28 or 30 or 32 or 34 or 35 or 38 or 40 Shore D. In other embodiments, the polyester/plasticizer composition is moderately soft having a hardness of no greater than about 60 Shore D. For example, the Shore D hardness may be within a range having a lower limit of 25, 28, 20, 32, 35, 36, 38, or 40, and an upper limit of 42, 45, 48, 50, 54, 56, or 60. In yet other embodiments, the polyester/plasticizer composition is moderately hard having a hardness with a lower limit of about 42, 44, 47, 51, 53, or 58 and an upper limit of about 60, 65, 72, 77, 80, 84, 88, 91, or 95 Shore D.

Further, in one embodiment, the polyester/plasticizer composition (when molded into a solid sphere) has a DCM compression of no greater than 70. For example, the DCM compression may be in the range of about 40 to about 65. In other embodiments, the polyamide/plasticizer composition is relatively soft and the DCM compression is no greater than 100. In yet other embodiments, the polyamide/plasticizer composition is relatively hard and the DCM compression may be greater than 100, for example, the DCM compression may be about 105.

It also is believed that adding the plasticizer to the polyester helps reduce the glass transition temperature (Tg) of the composition in many instances. Thus, in one embodiment, the first polyester (containing polyester only) composition has a first Tg value and the second polyester (containing polyester and plasticizer) composition has a second Tg value, wherein the second Tg value is at least 1 degree (1°) less; or at least 2° less; or at least 4° less; or at least 8°; or at least 10° less than the first Tg value. In another embodiment, the first Tg value and the second Tg value are approximately the same.

In addition, introducing plasticizers into the polyester composition generally helps to reduce the compression and/or increase the COR of the composition (when molded into a solid sphere and tested) versus a non-plasticized composition (when molded into a solid sphere and tested.) Plasticized polyester compositions typically show compression values lower, or at most equal to, non-plasticized compositions while the plasticized compositions display COR values that may be higher, or at the least equal to, non-plasticized compositions. This effect is surprising, because in many conventional compositions, the compression of the composition increases as the COR increases. In some instances plasticization of the composition might produce a slight reduction in the COR while at the same time reducing the compression to a greater extent, thereby providing an overall improvement to the compression/COR relationship over the non-plasticized composition.

Any of the polyester-comprising compositions herein may be blended with any number of additional polymers to form the core or cover layer of the invention herein. Such polymers include, for example, polyurethanes; polyureas; copolymers, blends and hybrids of polyurethane and polyurea; ethylene acid copolymer ionomer resins (for example, Surlyn® ionomer resins and HPF 1000 and HPF 2000, commercially available from DuPont; Lotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; cross-linked trans-polyisoprene and blends thereof; commercially available from DuPont; polyurethane-based thermoplastic elastomers, such as Elastollan®, commercially available from BASF; synthetic or natural vulcanized rubber; and combinations thereof. The polyester block copolymer also may be blended with rubbery elastomers in accordance with this invention. Such elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, alkyl acrylate rubber, chlorinated isoprene rubber, acrylonitrile chlorinated isoprene rubber, and combinations of two or more thereof.

Spheres Made of Polyester/Plasticizer Compositions

As shown in below Table 4, various polyester/plasticizer compositions may be made in accordance with this invention. It is significant that a blend comprising polyester and plasticizer may be prepared and the resulting composition has several advantageous properties that are particularly suitable for making golf ball components (for example, core, intermediate, and cover layers). For example, as shown in Table 4, a blend of 90% Hytrel 3078 (polyester copolymer) and 10% Ethyl Oleate (plasticizer) may be prepared and the resulting composition (solid sphere) has a COR of 0.701, DCM Compression of –27, and Shore D surface hardness of 27.8. The polyester/plasticizer compositions may contain other ingredients that do not materially affect the basic and novel characteristics of the composition. For example, mineral fillers may be added as discussed further below.

More particularly, solid spheres of each composition in Table 4 were prepared by injection-molding the compositions, and the COR, compression, Shore D hardness, and Shore C hardness of the resulting spheres were measured after two weeks. The surface hardness of a sphere is obtained from the average of a number of measurements taken from opposing hemispheres, taking care to avoid making measurements on the parting line of the sphere or on surface defects, such as holes or protrusions. Hardness measurements are made pursuant to ASTM D-2240 "Indentation Hardness of Rubber and Plastic by Means of a Durometer." Because of the curved surface, care must be taken to ensure that the sphere is centered under the durometer indentor before a surface hardness reading is obtained. A calibrated, digital durometer, capable of reading to 0.1 hardness units is used for all hardness measurements and is set to record the maximum hardness reading obtained for each measurement. The digital durometer must be attached to, and its foot made parallel to, the base of an automatic stand. The weight on the durometer and the attack rate conform to ASTM D-2240.

Also, in the following Table 4, the Soft and Fast Index (SFI) values of sample spheres made from polyester-based compositions are given. These SFI values are calculated by comparing the properties of the polyester-based compositions to commercially-available highly neutralized ethylene acid polymers (HNPs). These HNPs are considered among the most resilient thermoplastic materials at their respective compressions, and serve as high-performance reference points. More particularly, referring to FIG. 1, the Coefficient of Restitution (CoR) of some sample spheres made of polyester-based compositions of this invention are plotted against the DCM Compression (DCM) of the samples. In FIG. 1, the 'High-Performance Commercial HNP Index Line" is constructed from the properties of commercially-available highly neutralized polymers (HNP) with good resilience-to-hardness and resilience-to-compression relationships, e.g., HPF AD1035, HPF AD1035Soft, and HPF2000. These ethylene acid copolymers are highly neutralized (about 90% or greater neutralization levels). In particular, the compositions described in the Index Table (Table 5 below) were used to construct the Index. In FIG. 1, the plot shows resiliency versus compression only. But, there are also relationships between resiliency and hardness (Shore C and Shore D), and hardness values for various samples are reported in Tables 4 and 5.

As shown in the Index Line of FIG. 1, the CoR of the HPF sample spheres generally decreases as the DCM Compression of the spheres decreases. This relationship between the CoR and Compression in spheres made from conventional highly-neutralized ethylene acid copolymer ionomers (HNPs), as demonstrated by the Index Line, is generally expected. Normally, the resiliency of a sphere decreases as the compression of the sphere decreases. As expected, the resiliency of the polyester/plasticizer composition sample spheres (Hytrel and EO blends) also generally decreases as the compression decreases. However, one plasticized composition of this invention (Hytrel 3078 with 20% EO sample sphere) has a higher absolute CoR versus the HNP Index Line at the given compression, and thus has a positive SFI as shown in Table 4. In another plasticized composition of this invention (Hytrel 3078 with 10% EO sample sphere), the CoR of this sample is the same as the HNP Index Line at the given compression. In yet another instance, a sample sphere made of a plasticized material (Hytrel 4069 with 10% EO) is compared to a sample sphere made of a non-plasticized material (Hytrel 4069), and the CoR difference between sample spheres is only 0.004, while the Compression difference between the two sample spheres is 32 points. This means that there is an increase in CoR index value from −0.089 to −0.051 (+0.038 SFI) between the sample spheres, as shown in FIG. 1 and reported in Table 4. Having good resiliency values are advantageous features for golf ball components. In general, a core with high resiliency will reach a higher velocity when struck by a golf club and travel longer distances.

More particularly, there is an Index value calculated for each of the sample points in Line A. The Index value is calculated by subtracting the CoR value of the sample point on Line A from the corresponding point on the Index Line at a given compression. (The Index value can be a positive or negative number.) As shown, the Index value (SFI) generally increases as the CoR and Compression of the samples decrease (i.e., moving from right to left along Line A). For instance the Index value is greater for the Hytrel 3078 with 20% EO sample sphere than the Index values for the Hytrel 3078 with 10% EO sample sphere. The slope of Line A is less than the slope of the Index Line. Thus, the "drop-off" in CoR for a sample sphere as the compression decreases for the samples in Line A is less than the "drop-off" for the sample spheres in the Index Line. There are also Index values calculated for the sample points on Line B. As shown, the Index value increases as the CoR and Compression of the samples decrease (i.e., moving from right to left along Line B). For instance the Index value is greater for the Hytrel 4069 with 10% EO sample sphere than the Index value for the Hytrel 4069 sample sphere. The slope of Line B is less than the slope of the Index Line.

TABLE 4

Spheres Made From Polyester/Plasticizer Compositions

| 1st Ingred. | 2nd Ingred. | CoR@125 ft/s | Compression (DCM) | Shore D Hardness (Surface) | Shore C Hardness (Surface) | SFI Compression (DCM) | SFI Sh. D Hardness (Surface) | SFI Sh. C Hardness (Surface) |
|---|---|---|---|---|---|---|---|---|
| Hytrel 3078 (100%) | | 0.721 | −12 | 29.9 | 52.3 | 0.000 | −0.020 | −0.028 |
| Hytrel 3078 (90%) | Ethyl Oleate (10%) | 0.701 | −27 | 27.8 | 44.5 | 0.000 | −0.026 | −0.014 |
| Hytrel 3078 (80%) | Ethyl Oleate (20%) | 0.682 | −72 | 23.1 | 37.1 | 0.040 | −0.012 | −0.001 |
| Hytrel 4069 (100%) | | 0.727 | 60 | 41.4 | 65.0 | −0.089 | −0.095 | −0.077 |
| Hytrel 4069 (90%) | Ethyl Oleate (10%) | 0.723 | 28 | 33.4 | 58.8 | −0.051 | −0.043 | −0.054 |

TABLE 5

Index Table

| Example | Solid Sphere CoR | Solid Sphere Compression | Solid Sphere Shore D Hardness | Solid Sphere Shore C Hardness |
|---|---|---|---|---|
| HPF AD1035 | 0.822 | 63 | 41.7 | 70.0 |
| HPF AD1035 Soft | 0.782 | 35 | 35.6 | 59.6 |
| HPF 2000 | 0.856 | 91 | 46.1 | 76.5 |

HPF AD1035 - acid copolymer ionomer resin, available from the DuPont Company.
HPF AD1035 Soft - acid copolymer ionomer resin, available from the DuPont Company.
HPF 2000 - acid copolymer ionomer resin, available from the DuPont Company.

In general, the spheres made from the compositions comprising the polyester/plasticizer compositions have relatively high Coefficient of Restitution (COR) values at given compression and hardness values. In one embodiment, the molded sphere comprising the polyester composition has a COR of at least about 0.650, preferably at least about 0.700; a DCM Compression of no greater than about 70, preferably no greater than about 65; and Shore D surface hardness of no greater than about 50, preferably no greater than about 45. In one embodiment, the molded sphere has a COR of at least about 0.701; a DCM Compression of about 5 to about 65; and a Shore D surface hardness of about 20 to about 50.

It should be understood the golf ball materials, compositions, constructions, products, and methods for making the golf balls described and illustrated herein represent only some embodiments of the invention. Other compositions, constructions, and products can be made in accordance with this invention.

Additives and Fillers

A wide variety of additives and fillers may be included in the final polyester composition. Suitable additives and mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium dioxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

Other additives and fillers include, but are not limited to, chemical blowing and foaming agents, optical brighteners, coloring agents, fluorescent agents, whitening agents, ultraviolet (UV) light absorbers, UV light stabilizers, defoaming agents, processing aids, antioxidants, stabilizers, softening agents, fragrance components, plasticizers, and impact modifiers. In a particular embodiment, the total amount of additive(s) and filler(s) present in the polyester composition is 25 wt. % or less, 20 wt. % or less, 15 wt. % or less, or 12 wt. % or less, or 10 wt. % or less, or 9 wt. % or less, or 6 wt. % or less, or 5 wt. % or less, or 4 wt. % or less, or 3 wt. % or less, based on total weight of the polyester composition. More particularly, the polyester composition may include filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Organic fiber micropulp also may be added. In another version, the polyester compositions may contain carbon fibers or carbon fiber sheets comprising a weave of thin carbon fibers held together in a resin.

Core Structure

As discussed above, the core preferably has a dual-core structure comprising an inner core (center) made from a thermoset rubber composition and a surrounding outer core layer made from the thermoplastic polyester-based composition of this invention. In an alternative construction, the inner core is made of the polyester-based composition, and the outer core is made of a thermoset rubber composition. In yet another version, a dual-core with a center made of a first thermoplastic composition (for example, highly-neutralized polymers) and a surrounding outer core layer made of the thermoplastic polyester-based composition of this invention is constructed. Thus, in this type of core construction, both the inner and outer core layers are made of thermoplastic compositions and at least one of the layers is made of the thermoplastic polyester-based composition of this invention. In these constructions, any suitable thermoplastic polymer may be used to form one of the core layers. Particularly preferred thermoplastic polymers (for example, highly-neutralized polymers) are described herein. Dual-layered cores, wherein both the inner and outer core layers are made of the polyester-based composition also may be made. Finally, a golf ball construction having a single-layered core made of the polyester-based composition may be prepared.

As discussed above, in one preferred version, the inner core (center) is preferably made from a thermoset rubber composition. Any suitable rubber composition known in the art may be used to make the center of the ball in accordance with this embodiment. In general, such rubber compositions contain a base rubber, free-radical initiators, crosslinking agents, and filler. Suitable base rubbers include, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc. of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include fillers, which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Preferably, the base rubber material is polybutadiene rubber, and this material may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The rubber compositions also preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA).

Hardness of Core

The hardness of the core assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient. For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient. On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient. In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 15 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 85 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 70 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 88 or 89 or 90 or 92 or 95 Shore C.

The midpoint of a core layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$),Of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, in one embodiment, the inner core is preferably formed from a thermoset rubber composition.

And, the outer core layer is formed preferably from a polyester thermoplastic elastomer.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. In another embodiment, there is a zero or negative hardness gradient across the core assembly. For example, the center of the core ($H_{inner\ core\ center}$) may have a hardness gradient in the range of 20 to 90 Shore C; and the outer surface of the outer core may have a hardness gradient in the range of 10 to 80 Shore C. The hardness gradient across the core assembly will vary based on several factors including, but not limited to, the dimensions of the inner core, intermediate core, and outer core layers.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed above, the golf ball contains a cover which may be multi-layered and the ball also may contain intermediate layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core assembly is in the range of about 1.45 to about 1.62 inches.

The hardness of the core assembly (for example, inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core assembly needs to be attained. The present invention provides core assemblies having both good resiliency (CoR) and compression properties.

Cover Structure

The golf ball cores of this invention may be enclosed with one or more cover layers. For example, golf ball having inner and outer cover layers may be made. In addition, as discussed above, an intermediate layer may be disposed between the core and cover layers. The intermediate layer preferably has good moisture vapor barrier properties to prevent moisture from penetrating into the core structure. The cover layers preferably have good impact durability and scuff-resistance. The polyester compositions of this invention may be used to form at least one of the intermediate and/or cover layers. In other versions, the intermediate layer and cover layers are formed from polymeric materials other than the polyester compositions of this invention.

For example, the golf ball sub-assembly may include a core (and optional intermediate layer), and an inner cover layer disposed about the core structure. Then, an outer cover comprising the polyamide composition of this invention may be applied over the inner cover. In another version, the golf ball sub-assembly includes the core (and optional intermediate layer) and an inner cover comprising the polyamide composition of this invention disposed about the core. An outer cover made of a polyamide or other polymer material may be applied over the polyamide inner cover. In some versions, the inner cover layer is harder than the outer cover layer; while in other versions, the hardness level is reversed, that is, the outer cover layer is harder than the inner cover.

More particularly, in one version, a golf ball comprising a core having at least one layer(for example, an inner core formed from a thermoset rubber, and an outer core formed from a highly neutralized ethylene acid copolymer ionomer resin) may be formed. Then, an inner cover made from a relatively the polyester/plasticizer composition of this invention may be molded over the core sub-assembly to form an inner cover. A relatively hard or relatively soft outer cover layer comprising a cover layer composition as described above may be molded over the inner cover. In one version, the outer cover is harder than the softer, thermoplastic inner cover. In another version, the outer cover is softer than the thermoplastic inner cover.

As discussed above, the polyester/plasticizer compositions of this invention may be used to form one or more layers of the golf ball including, but not limited to core, intermediate, and cover layers. A wide variety of other materials may be used to form the layers of the golf ball in accordance with this invention including, but not limited to, polyurethanes; polyureas; copolymers, blends and hybrids of polyurethane and polyurea; ethylene acid copolymer ionomer resins (for example, Surlyn® ionomer resins and HPF® 1000 and HPF® 2000, commercially available from DuPont; Lotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to help make a golf ball having high resiliency and a soft feel. By the term, "hybrids of polyurethane and polyurea," it is meant to include copolymers and blends of polyurethanes and polyureas.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one preferred embodiment, the ball includes a dual-cover comprising inner and outer cover layers. The inner cover layer is preferably formed from a composition comprising an ionomer or a blend of two or more ionomers that helps impart hardness to the ball. The inner cover layer preferably has a material hardness of 95 Shore C or less, or less than 95 Shore C, or 92 Shore C or less, or 90 Shore C or less, or a material hardness within a range having a lower limit of 60 or 65 or 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont), which is a maleic anhydride-grafted, metallocene-catalyzed ethylene-butene copolymer having about 0.9 wt % maleic anhydride grafted onto the copolymer. One example of a blend of high acid ionomer and maleic anhydride-grafted polymer is 84 wt. %/16 wt. % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In another embodiment, the inner cover layer is formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is formed from a composition comprising a 50/25/25 blend of Surlyn® 8940/Surlyn® 9650/Surlyn® 9910, preferably having a material hardness of about 90 Shore C. In one preferred version, a blend of 50% Surlyn® 7940 and 50% Surlyn® 8940 is used to form the inner cover. In yet another embodiment, the inner cover layer is preferably formed from a composition comprising a 50/50 blend of Surlyn® 8940/Surlyn® 9650, preferably having a material hardness of about 86 Shore C. Surlyn® 8940 is an ethylene/methacrylic acid copolymer in which the MAA acid groups have been partially neutralized with sodium ions. Surlyn® 9650 and Surlyn® 9910 are two different grades of ethylene/methacrylic acid copolymer in which the MAA acid groups have been partially neutralized with zinc ions. Surlyn® 7940 is a copolymer of about 85% ethylene and 15% methacrylic acid that has been neutralized with lithium ions. Nucrel® 960 is an ethylene/methacrylic acid copolymer resin nominally made with 15 wt % methacrylic acid, and available from DuPont.

As discussed above, the dual-core of the golf ball may be enclosed with a single-layered or multi-layered covers. In one embodiment, a single-layered cover having a thickness in the range of about 0.015 to about 0.090 inches, more preferably about 0.030 to about 0.070 inches, is formed. The cover has a hardness of about Shore D 80 or less, more preferably 70 or less, and most preferably about 60 or less. In another embodiment, a multi-layered cover comprising inner and outer cover layers is formed, where the inner cover layer preferably has a thickness of about 0.011 inches to about 0.110 inches, more preferably about 0.02 inches to about 0.08 inches. In this version, the inner cover layer is formed from a blend of partially- or fully-neutralized ionomers, and the cover has a Shore D hardness of greater than about 55, more preferably greater than about 60, and most preferably greater than about 65. The outer cover layer, in this embodiment, preferably has a thickness of about 0.010 inches to about 0.100 inches, more preferably about 0.02 inches to about 0.06 inches, and most preferably about 0.025 inches to about 0.045 inches, with a hardness of about 80 Shore D or less, more preferably 70 or less, and most preferably about 60 or less. Thus, the cover may comprise two or more layers and preferably has an overall thickness of about 0.020 to about 0.160 inches. The inner cover layer is harder than the outer cover layer in this version. In one example, the outer cover layer is formed from a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed; that is, the outer cover layer is harder than the inner cover layer.

Golf Ball Constructions

As discussed above, the thermoplastic polyamide compositions of this invention may be used to form a core for any suitable ball construction, including, for example, two-piece, three-piece, four-piece, and five-piece designs.

The solid cores for the golf balls of this invention may be made using any suitable conventional technique such as, for example, compression or injection molding. Typically, the inner core is formed by compression molding a slug of uncured or lightly cured rubber material into a spherical structure. The outer core, which surrounds the inner core, is formed by molding the polyamide composition over the inner core. Compression or injection molding techniques may be used. Then, the intermediate and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball subassembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane composition may be formed by using a casting process.

For example, in one version of the casting process, a liquid mixture of reactive polyurethane prepolymer and chain-extender (curing agent) is poured into lower and upper mold cavities. Then, the golf ball subassembly is lowered at a controlled speed into the reactive mixture. Ball suction cups can hold the ball subassembly in place via reduced pressure or partial vacuum. After sufficient gelling of the reactive mixture (typically about 4 to about 12 seconds), the vacuum is removed and the intermediate ball is released into the mold cavity. Then, the upper mold cavity is mated with the lower mold cavity under sufficient pressure and heat. An exothermic reaction occurs when the polyurethane prepolymer and chain extender are mixed and this continues until the cover material encapsulates and solidifies around the ball subassembly. Finally, the molded balls are cooled in the mold and removed when the molded cover is hard enough so that it can be handled without deformation.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Figure 2:
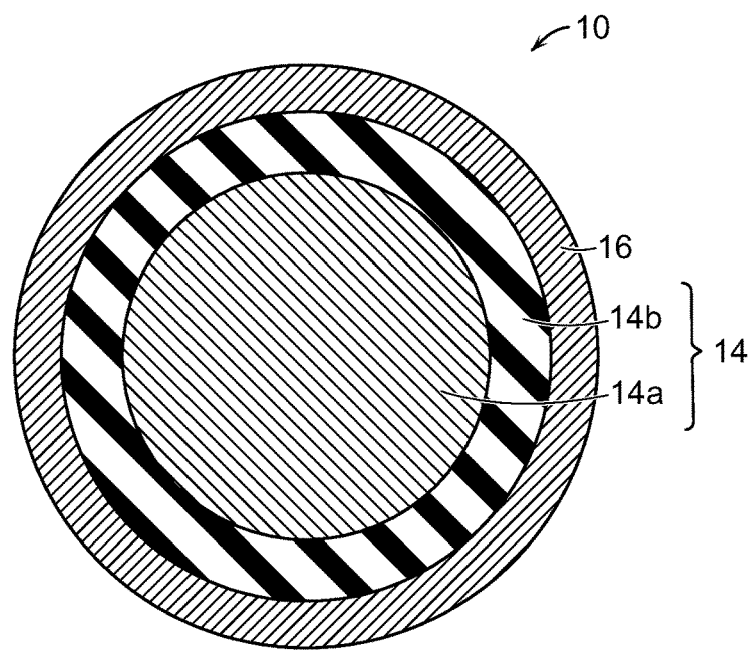
FIG. 2 is a cross-sectional view of a three-piece golf ball having a dual-core comprising an inner core/outer core, and a cover layer made in accordance with this invention.
Figure 3:
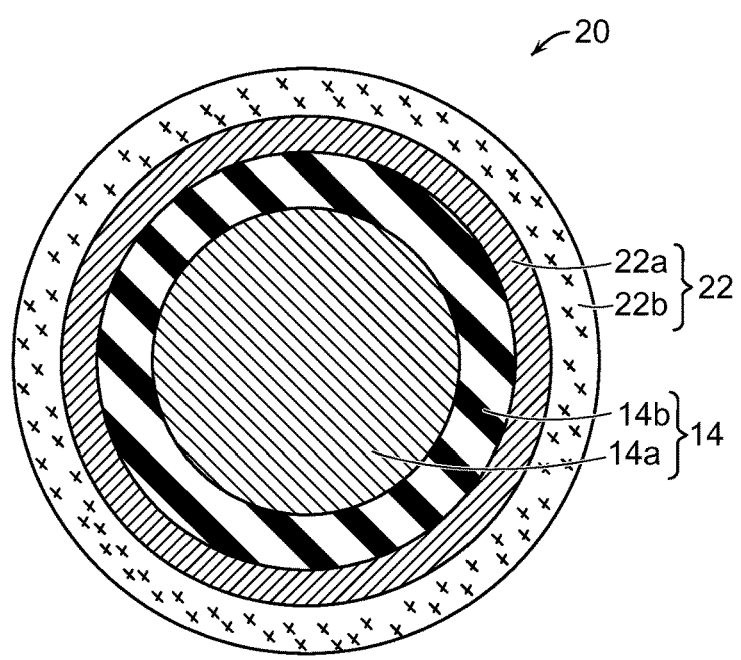
FIG. 3 is a cross-sectional view of a four-piece golf ball having a dual-core comprising an inner core/outer core; an inner cover layer; and an outer cover layer made in accordance with the present invention.

Referring to FIG. 2, one version of a golf ball that can be made in accordance with this invention is generally indicated at (10). The ball (10) contains a dual-core (14) having an inner core (center) (14a) and outer core layer (14b) surrounded by a single-layered cover (16). The center (14a) is formed preferably from a rubber composition as discussed above. The outer core layer (14b) is formed from a polyester/plasticizer composition as discussed above. In FIG. 3, a golf ball (20) containing the above-described dual-core (14) is surrounded by a dual-cover (22) having an inner cover layer (22a) and outer cover layer (22b), which may be formed from any of the cover materials described above.

The surfaces of the golf balls shown in FIGS. 2-3 may have various dimple patterns to modify the aerodynamic properties of the ball. It should be understood the golf balls shown in FIGS. 2-3 are for illustrative purposes only and not meant to be restrictive. Other golf ball constructions can be made in accordance with this invention.

For example, a golf ball containing an inner core (center); an intermediate core layer; and an outer core layer may be made. The center preferably has a diameter within a range having a lower limit of 0.100 or 0.125 or 0.250 inches and an upper limit of 0.375 or 0.500 or 0.750 or 1.00 or 1.30 inches. The intermediate core layer preferably has a thickness within a range having a lower limit of 0.050 or 0.100 or 0.150 or 0.200 inches and an upper limit of 0.300 or 0.350 or 0.400 or 0.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

In one embodiment, the inner core (center) is made of the polyester/plasticizer composition of this invention. The surrounding intermediate core layer is made of a rubber composition comprising a base rubber such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), poly-alkenamers such as, for example, polyoctenamer, butyl rubber, halobutyl rubber, and polystyrene elastomers. Finally, the outer core layer also is made of the polyamide/plasticizer composition of this invention.

It is recognized that additional golf ball constructions can be made without departing from the spirit and scope of the present invention. For example, in another version, a golf ball containing a multi-layered core having: i) an inner core (center) made of a rubber composition as described above; ii) a surrounding intermediate core layer made of the polyester composition of this invention; and iii) an outer core layer made of a rubber composition, can be manufactured. In yet another version, both the inner core (center) and intermediate core layer each are made of a rubber composition; and the outer core layer is made of the polyester composition of this invention. In a further embodiment, both the inner core (center) and intermediate core layer are made of the polyester composition of this invention; and the outer core layer is made of a rubber composition.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements and is set to record the maximum hardness reading attained for each measurement. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. Also, once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. The DCM is an apparatus that applies a load to a core or ball and measures the number of inches the core or ball is deflected at measured loads. A load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

Coefficient of Restitution ("COR"). The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period (COR=$V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
   a) dual core comprising an inner core and outer core layer, the inner core having an outer surface and geometric center and, the outer core layer having an outer surface and midpoint; the inner core comprising a rubber composition and the outer core layer comprising a polyester-based thermoplastic elastomer composition, the polyester-based composition comprising;
      i) about 40 to about 99% by weight polyester thermoplastic elastomer; and
      ii) about 1 to about 60% by weight of an alkyl oleate plasticizer selected from the group consisting of methyl oleate, ethyl oleate, propyl oleate, butyl oleate, and octyl oleate, and mixtures thereof
   wherein the midpoint and outer surface of the outer core layer each has a hardness, and the outer surface hardness is greater than the midpoint hardness to provide a positive hardness gradient in the outer core layer; and
   b) cover having at least one layer disposed about the core.

2. The golf ball of claim 1, wherein the midpoint hardness of the outer core layer is in the range of about 40 to about 80 Shore C and the outer surface hardness of the outer core layer is in the range of about 48 to about 88 Shore C.

3. The golf ball of claim 1, wherein the outer surface hardness of the outer core layer is greater than midpoint hardness of the outer core layer by at least 5 Shore C units.

4. The golf ball of claim 1, wherein the center of the inner core and outer surface of the outer core layer each has a hardness, and the outer surface hardness of the outer core layer is greater than the center hardness of the inner core.

5. The golf bail of claim 1, wherein the center and outer surface of the inner core each has a hardness, and the outer surface hardness is greater than the center hardness to provide a positive hardness gradient in the inner core.

6. The golf ball of claim 1, wherein the polyester thermoplastic elastomer is a polyester-polyether block copolymer.

7. The golf hall of claim 1, wherein the polyester-based thermoplastic elastomer composition further comprises an acid copolymer of ethylene and an α,β-unsaturated carboxylic acid, optionally including a softening monomer selected from the group consisting of alkyl acrylates and methacrylates; and a cation source present in an amount sufficient to neutralize from about 0 to about 100% of all acid groups present in the composition.

8. The golf hall of claim 7, wherein the acid copolymer of ethylene contains acid groups and greater than 70% of the acid groups ate neutralized.

9. The golf ball of claim 1, wherein the polyester-based composition comprises about 10 to about 30% by weight plasticizer.

* * * * *